(12) United States Patent
Liesegang

(10) Patent No.: US 6,540,349 B1
(45) Date of Patent: Apr. 1, 2003

(54) SPECTACLES FRAME

(76) Inventor: José Joaquim Liesegang, Aachener Str. 71, D-50674 Köln (DE)

(*) Notice: Subject to any disclaimer, the term of this patent is extended or adjusted under 35 U.S.C. 154(b) by 0 days.

(21) Appl. No.: 09/744,316
(22) PCT Filed: Jul. 14, 1999
(86) PCT No.: PCT/DE99/02173
§ 371 (c)(1), (2), (4) Date: Jan. 19, 2001
(87) PCT Pub. No.: WO00/05617
PCT Pub. Date: Feb. 3, 2000

(30) Foreign Application Priority Data

Jul. 20, 1998 (DE) .......................... 198 32 521

(51) Int. Cl.⁷ .................................................. G02C 5/08
(52) U.S. Cl. .......................................... 351/63; 351/126
(58) Field of Search ............................ 351/63, 41, 126

(56) References Cited

U.S. PATENT DOCUMENTS

| | | | | |
|---|---|---|---|---|
| 1,230,555 A | * | 6/1917 | Brennecke | 351/63 |
| 1,733,235 A | * | 10/1929 | Obrig et al. | 351/63 |
| 2,975,426 A | * | 3/1961 | Rabb | 351/63 |
| 3,361,514 A | | 1/1968 | Davis | 351/63 |
| 5,028,126 A | | 7/1991 | Takeuchi | 351/63 |
| 5,929,966 A | * | 7/1999 | Conner | 351/118 |

FOREIGN PATENT DOCUMENTS

| | | |
|---|---|---|
| EP | 0 825 475 | 2/1998 |
| EP | 0 907 094 | 4/1999 |
| FR | 1 594 831 | 6/1970 |
| GB | 995 963 | 6/1965 |
| GB | 2 253 712 | 9/1992 |

* cited by examiner

Primary Examiner—Huy Mai
(74) Attorney, Agent, or Firm—Akerman Senterfitt

(57) ABSTRACT

The spectacles with two lenses (1, 2) has at least one resting surface (6) for the nose of a spectacles wearer, two supporting elements (7, 8), which are laterally arranged on the spectacle lenses (1, 2) and whose length is measured such that they do not project beyond the temples of the spectacles wearer. The supporting elements (7, 8) comprise resting elements (16, 17) on their sides facing the head of the spectacles wearer. A hinge (11) is arranged between the lenses (1, 2), whereby the spectacles can be placed in a non-use position in which the spectacle lenses (1, 2) are essentially arranged one above the other and can be unfolded into a position for wearing. The supporting elements (7, 8) form a fixed angle with the respective adjacent lens (1, 2). A spring element (15) is arranged in the area of the hinge (11), the spring element (15) pressing the supporting elements (7, 8) against the temple region of the spectacles wearer in the area of the resting elements (16, 17) so that the supporting elements (7, 8) are held on the head of the spectacles wearer in a non-positive manner.

7 Claims, 5 Drawing Sheets

Figure 3:
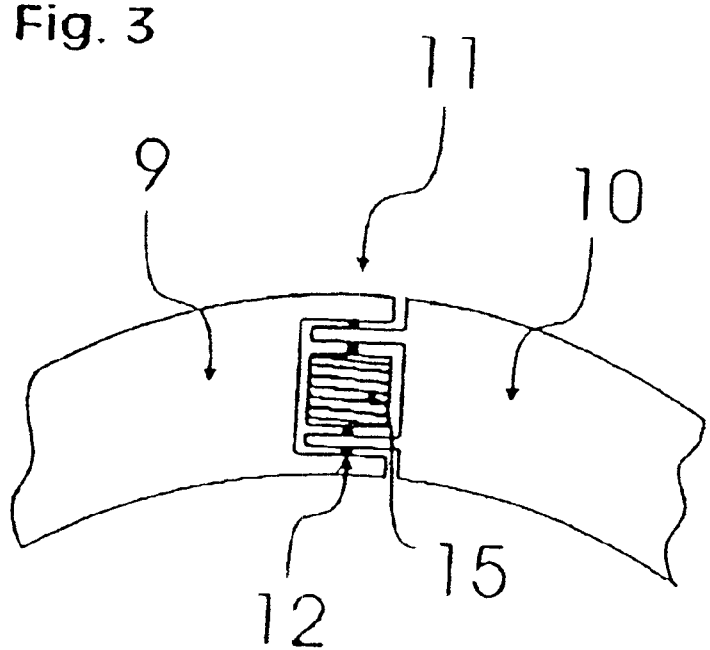

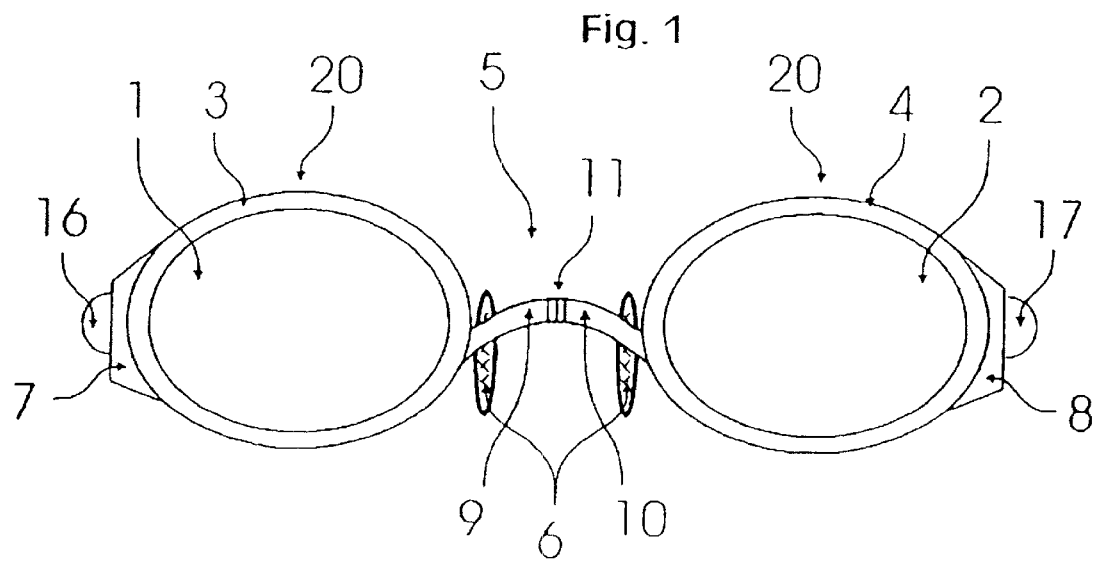
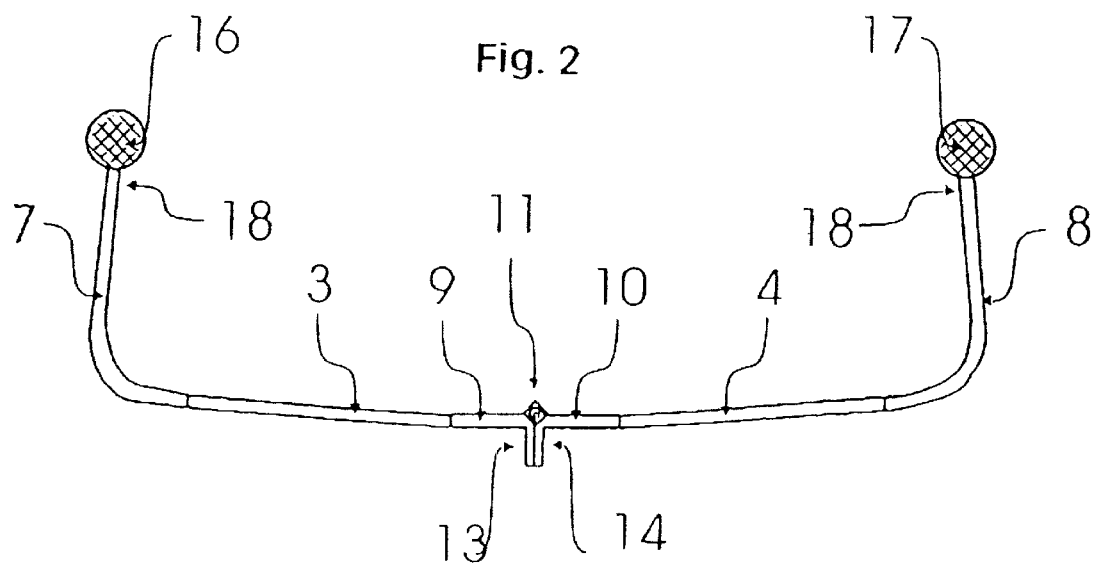

SPECTACLES FRAME

The invention relates to spectacles with at least one lens, at least one resting surface for the nose of a spectacles wearer and two laterally arranged, pivotal supporting elements.

Different types of spectacles are known. They consist of a frame generally provided with side pieces hooking behind the ears and made of metal and/or plastic and of two lenses which are joined together by a fitting or by mounts. In the case of spectacles having a fitting, the lenses are fitted in the triangular groove provided for in the rims of said fitting. Said rims are joined together by a bar in the case of bar glasses or by a bridge which is not resting on the nose in the case of glasses with nose pads, said nose pads resting laterally on the nose and being movable. Bar glasses have been previously proposed in which the lenses are made in one piece, the bar being formed by a bight portion of the lens in the region of the nose.

The side pieces resting on the ears are pivotally fastened to the fitting's rims by means of hinges.

On rimless glasses, the lenses are pierced at the points of junction of the bridge and of the side pieces and are held in place there by means of one clip and one screw each.

There have been various attempts at improving the wearing comfort of spectacles by configuring the frame in a particular way. EP 0 825 475 A1 for example discloses eyeglasses with pivotally carried side pieces and with a spring mechanism which allows the side pieces when being used to pivot from a normal, open position in opposite directions against the force of the spring. This enables a wearer of glasses to take the glasses off the head with a lateral movement instead of always having to take them off the head in the direction of the field of vision.

All these glasses have in common that the side pieces hooking behind the ears may sometimes disturb and more specifically occasion pressure sores or irritations of the skin. Nose pad spectacles without side pieces but with a resiliently compressing bridge are known as pince-nez. These glasses are only held in place over the nose. The spring forces thereby acting on the nose are high so that pressure sores may occur, thus exacerbating discomfort.

It is an object of the present invention to design spectacles which do not have the disadvantages indicated herein above.

The solution of this object is to provide the spectacles of the invention with two lenses, at least one resting surface for the nose of a spectacles wearer, two supporting elements laterally arranged on the lenses, a hinge arranged between the lenses as well as with an elastic element arranged in the area of said hinge. On account of said hinge, the spectacles are provided with a wearing position and with a non-use position in which the lenses are substantially lying over each other.

The supporting elements each form a fixed angle with the respective adjacent lens, said angle preferably ranging from 60° to 120°. The length of the supporting elements is measured such that, when worn, said supporting elements do not project beyond the temples of the spectacles wearer. On their sides facing the head of the wearer, the resting elements are provided with resting elements. The spring element arranged between the lenses presses the supporting elements against the temples of the wearer in the area of the resting elements so that the supporting elements are held on the head of the spectacles wearer in a non-positive manner. A particularly secure holdfast of the spectacles is generally achieved by the frictional connection between the resting elements and the temples of the wearer, and between the resting surface and the nose of the wearer.

The holdfast of the spectacles according to the invention which results from the force exerted by the spring element onto the temples of the wearer is reinforced when the laterally arranged supporting elements are as rigid as possible, in particular when they are provided with the smallest possible flexibility. This may for example be achieved by metallic supporting elements having an appropriate cross section. A comparable effect may also be achieved by means of an appropriate synthetic material, in particular by means of a fibre-reinforced synthetic material. A particularly advantageous effect is obtained when the hinge and the spring element are combined in one component part, this one component part effecting as a hinge and as a spring as well. Such an element may for example be realized by means of a bar that unites the lenses, in particular by means of a nose piece consisting of an elastically deformable metal.

The spring element can also be made of an elastically deformable synthetic material. It is more specifically possible to realize such a component part that effects as a hinge and as a spring as well.

A particularly advantageous effect is obtained, when the material chosen for the spring element is a synthetic material that is elastically deformable and that is provided with a high inner buffering capacity so that the elastic element deforms quite fast under the action of external forces and that the spring element returns quite slowly to its initial position when no longer under the action of external forces. It is particularly advantageous when the return movement of the spring element takes five seconds, preferably 15 seconds.

The resting elements may be spring elements of a substantially spherical shape which are more specifically arranged at the ends of the supporting elements. The use of such resting elements permits to achieve a particularly close fit of the glasses when the length of the supporting elements is selected so as to allow the spherical resting elements to be approximately positioned in the area where the arch of the eyebrow terminates on the temple side of the wearer when the glasses are sitting on the nose of a spectacles wearer.

A particularly secure fit of the resting elements on the temple-sided arch ends of the wearer's eyebrows may be achieved even without spherical resting elements by choosing the right length for the supporting elements as well as by the position of the resting elements fastened by their inner sides. This may more specifically be achieved when the supporting elements are between 1.5 cm and 4.5 cm long.

In another advantageous embodiment the rotational axis of the hinge, which is arranged between the lenses, is inclined to that straight line passing through the two highest points of the lenses at an angle of less than 90°, preferably less than 80°, in particular less than 70°. It is particularly advantageous when the axis of rotation of the hinge substantially runs in the plane which is defined by the lenses or in a plane running parallel thereto. Such an orientation of the axis of rotation of the hinge entails that, in the non-use position which is characterized by overlying lenses, the supporting elements of the spectacles are not directly lying over each other but rather beside each other. By selecting the proper angle of the axis of rotation with respect to the straight line mentioned, it may be achieved that the supporting elements come to lie completely beside each other in the non-use position.

It is also advantageous when the spectacles are locked when in the non-use position mentioned. This may be achieved by non-positive or positive interlocking of the supporting elements and/or the resting elements. It is therefore particularly favorable when the spectacles are designed with the rotational axis of the hinge being non-vertically arranged with respect to the straight line passing through the two highest points of the lenses.

Another advantageous development is achieved when the spectacles are provided with at least one spring element which presses the supporting elements against the head of the spectacles wearer so that the supporting elements are held on the head of the spectacles wearer in a non-positive manner. Spectacles of this kind do not need a side piece. It is enough when the supporting elements cover one portion of the temples of the spectacles wearer. In this area, the supporting elements are fixed by the pressure applied by the spring element so that the spectacles resting on the nose are sufficiently secured against slipping out of place. Since, as compared to the resting surface on pince-nez, the surface of the supporting elements which rests on the head is large, pressure sores may be essentially avoided. In a preferred embodiment, the spectacles are provided with two lenses united by way of the spring element. The spring element may consist of a spring side piece made of synthetic material for example, the lenses lying side by side in a non-use position and wherein said lenses may be unfolded against the force of a spring. The spring element used may be a flat spiral spring, the ends thereof being connected by way of jointed bridges to one lens each.

The supporting elements may thereby be arranged on the lenses in such a way that they may be pivoted, starting from a position in which they are essentially parallel to the lenses, into a position which allows the spectacles wearer to put on his glasses. These spectacles are particularly small when folded since the lenses are lying over each other and since the folded supporting elements hardly—if at all—project beyond the rim of the lenses.

The supporting elements may also be rigidly connected to the lenses however, in which case they are pivotal in conjunction with the lenses.

In another design of this embodiment, the lenses are joined together by two bridges, the spring element being arranged between the bridges and each bridge being provided with an arm of a lever in the area of the spring element, the lever arms being set at an angle when the spectacles are folded and abutting when the spectacles are unfolded. The lever arms may be used to unfold the spectacles by pressing them onto each other against the force of the spring.

The spring element may be designed as a spiral spring whose ends are connected to the lever arms.

In another advantageous embodiment of the invention, the supporting elements are connected to the lens by way of spring elements. The advantage thereof is that the bridge over the nose may be freely fashioned without having to think of a spring element.

It is advantageous when the surfaces of the supporting elements facing the head of the wearer are provided with an elastic top surface. The shape of the supporting element may thus conform to the shape of the head so that the contact surfaces between the supporting element and the head are as large as possible thus allowing the frictional forces to be as high as possible. Such an elastic top surface may be formed by a gel pad.

To increase the frictional forces it is also advantageous when the surfaces of the supporting elements facing the head of the wearer are provided with a top surface having a high coefficient of friction. Accordingly, the top surface may be made of a neoprene-like material.

The invention will be described more explicitly in the following with the help of the representation of a preferred embodiment.

Figure 4:
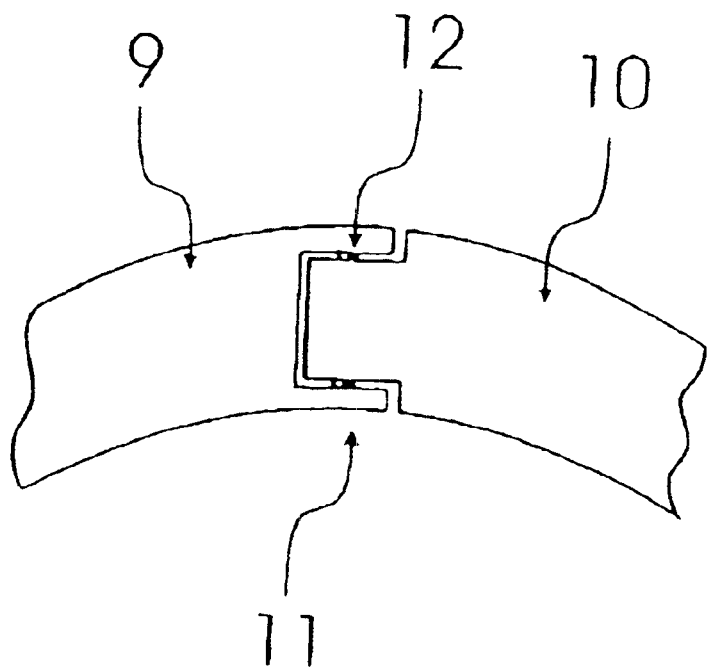
Figure 5:
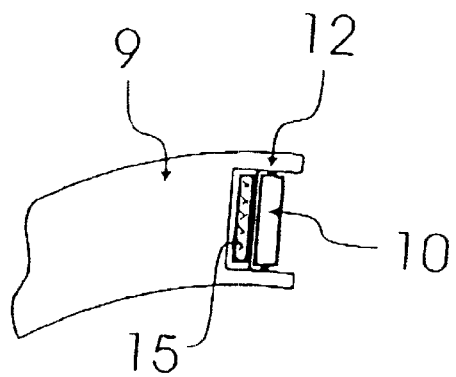
Figure 6:
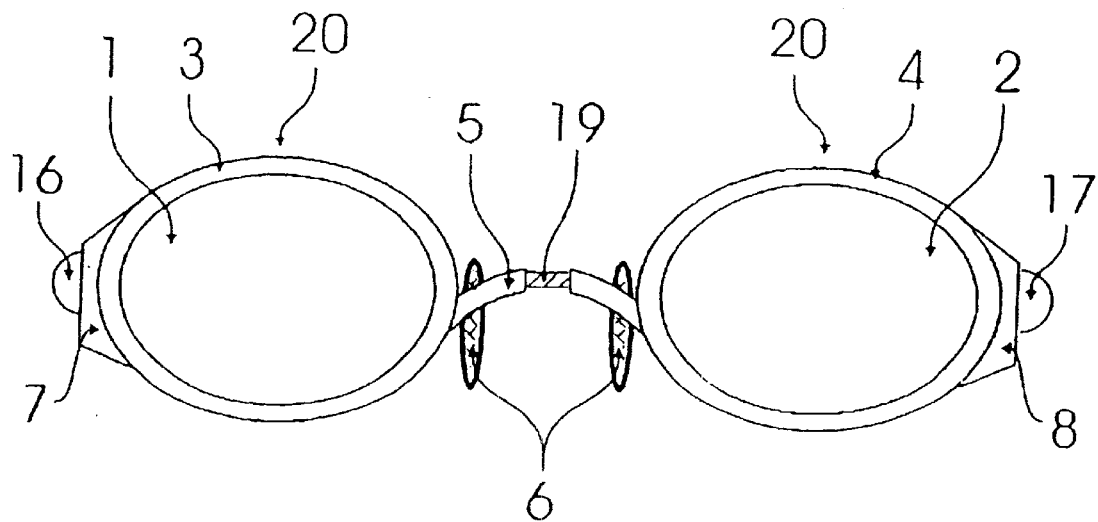
Figure 7:
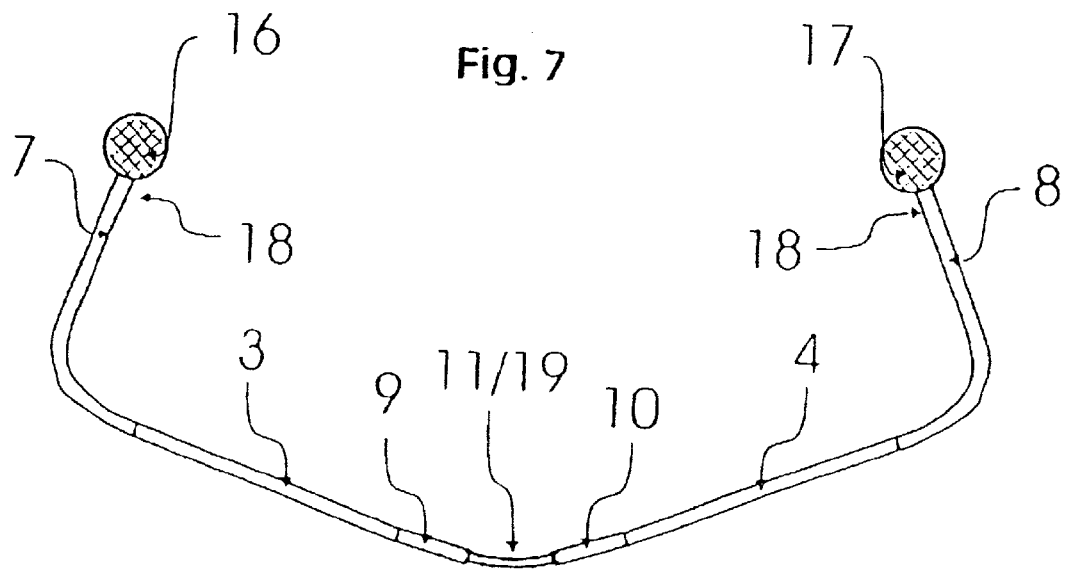
Figure 8:
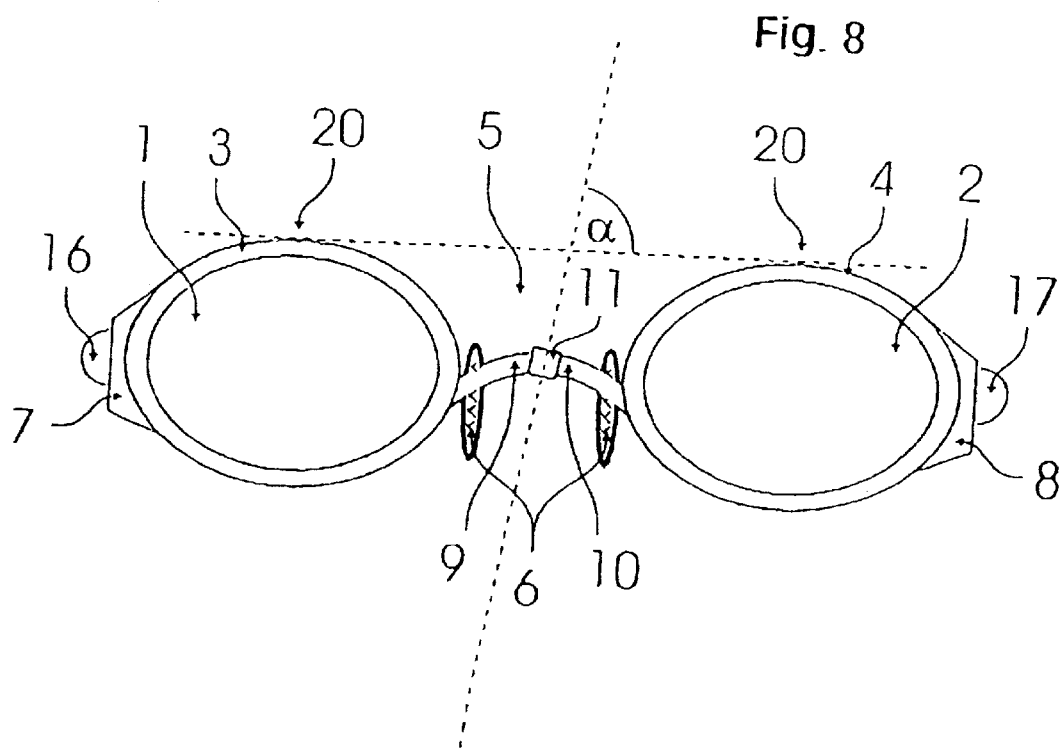
Figure 9:
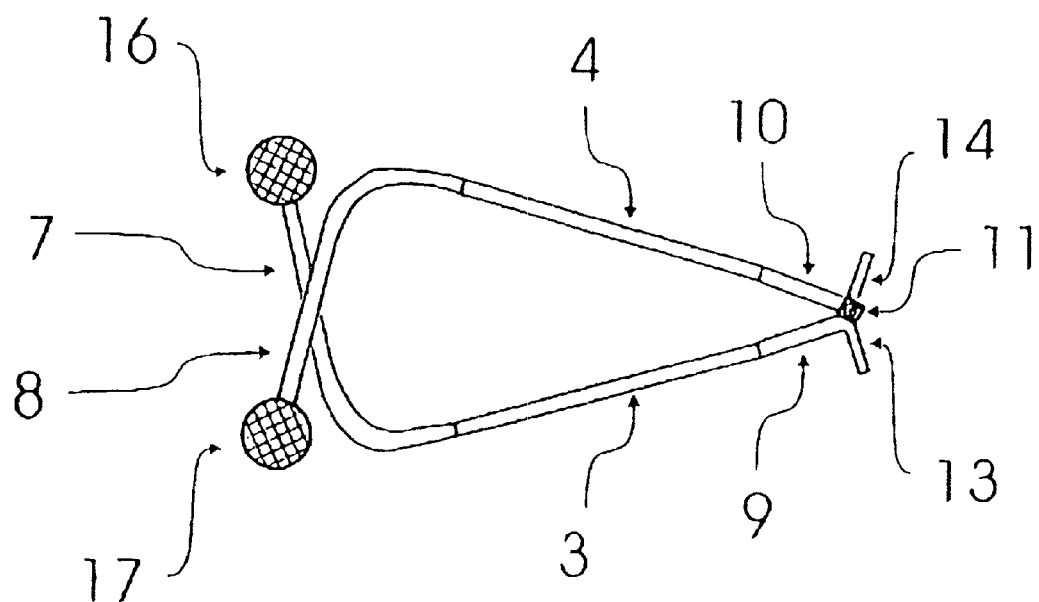

FIG. 1 shows a front view of a first embodiment,
FIG. 2 shows a top view of the first embodiment,
FIG. 3 shows an enlarged rear view of the bridge of said first embodiment,
FIG. 4 shows an enlarged rear view of the bridge of a second embodiment,
FIG. 5 shows an enlarged rear view of the bridge of said second embodiment when the spectacles are placed in a non-use position,
FIG. 6 shows a front view of a third embodiment,
FIG. 7 shows a top view of said third embodiment,
FIG. 8 shows a front view of a fourth embodiment,
FIG. 9 shows a top view of spectacles according to the invention placed in a non-use position.

As more specifically shown in FIG. 1, the depicted embodiment of the spectacles according to the invention is provided with a first and a second lens 1, 2 which are fitted in bows 3, 4, said bows being joined together by way of a nose piece 5 having a resting surface 6 for the nose of a spectacles wearer. Supporting elements 7, 8 are rigidly connected to the external sides of the bows.

The nose piece 5 is provided with two bridges 9, 10 which form a ridge and which are pivotally joined together by way of a hinge 11 fitted with an axis 12 as shown in FIG. 2. In the region of the hinge 11, the bridges are fitted with lever arms 13, 14 which are running at right angles to their longitudinal axis.

A spiral spring 15 is arranged about the axis 12 of the hinge 11 (see FIG. 3), the free ends of said spiral spring each engaging in one lever arm 13, 14 (not shown). As a result, the lever arms 13, 14, which are abutting when the spectacles are unfolded, are pressed apart so that the lenses 3, 4 and accordingly the supporting elements 7, 8 are pivoted toward each other about the hinge axis 12. When the spectacles are worn, the supporting elements 7, 8 are thus pressed against the head of the spectacles wearer and fixated. More specifically, the elastic spherical resting elements 16, 17 are pressed against the head of the wearer.

FIG. 4 shows an enlarged view of a nose piece 5 of another embodiment. The spectacles are placed in their position of use. A recess is provided in the first bridge 9, a pin of a second bridge 10 engaging in said recess. This pin is rotatably carried in the recess of the first bridge 9 by means of an axis 12. This is the way the hinge 11 is formed. The angle of rotation of the hinge 11 is limited by a surface on the rear side of the recess in the first bridge 9, said surface constituting a stop face against which the pin of the second bridge 10 strikes. This is also evident from FIG. 5 which shows the nose piece of this embodiment in the non-use position of the spectacles. Here, the second bridge 10 is pivoted about the axis 12 of the hinge 11 toward the first bridge 9. The surface constituting a stop face thus becomes visible. Said surface is covered with a spring element 15 which elastically deforms when the spectacles are placed in their position of use. On account of the resilience of the spring element 15, said spring element causes the supporting elements and in particular the resting elements 16, 17 to apply pressure on the temples of a spectacles wearer. When the spectacles are taken off, they are returned to their non-use position under the readjusting action of the spring element.

Such a spring element may be manufactured from a foam-like synthetic material of the firm 3M for example as it is known to be used for fabricating earplugs for inserting into the human auditory canal. Such a synthetic material is very elastic and may be compressed strongly. Whenever external forces are no longer applied, the synthetic material relaxes into its initial position, said relaxation occurring slowly on account of the strong inner buffering capacity of the synthetic material, in particular over a period of time of more than five, preferably of more than 15 seconds.

A third embodiment is shown in FIG. 6. This one essentially includes another execution of the hinge 11 and of the spring element 15. Both elements are combined into one component part 19. In this embodiment, the component part consists of a portion made of synthetic material or of metal and arranged between the partial bridges 9 and 10 in the nose piece 5. This component part combines the hinge effect of the hinge 11 with the spring effect of the spring element 15. It is provided with a resting position for example, as it is best shown from the top in FIG. 7. When spectacles in accordance with this embodiment are put on by a spectacles wearer, the distance between the resting surfaces 18 increases, thus allowing the component part 19 to be elastically deformed. A readjusting force is thus generated which fixes the resting surfaces 18 and hence the supporting elements 7 and 8 in a secure and non-positive manner to the temples of the spectacles wearer.

In another advantageous embodiment, the element 19 may be much more angled so that the spectacles are placed in non-use position, which is characterized by substantially overlying lenses 1, 2, when the component part 19 is in its initial position. Comparable achievements are possible with other spring elements 15 and hinges 11, of course. The non-use position of spectacles having a hinge 11 and a separate spring element 15 can be surveyed from FIG. 9.

In an advantageous development, the spectacles are fixed in the non-use position in particular by interlocking the supporting elements 7, 8 and/or the resting elements 16, 17 in a positive or non-positive manner. This may be achieved in particular by setting the axis of rotation of the hinge 11 at an angle of less than 90°, preferably less than 80°, in particular less than 70° with respect to the straight line passing through the two highest points 20 of the lenses 1 and 2. This is shown in FIG. 8. When the hinge 15 is executed in this way, the non-use position of the spectacles is characterized in that the lenses 1, 2 are not fully superposed. The supporting elements 7, 8 in particular are not superposed. By selecting the proper angle □, it may be achieved that the supporting elements 7, 8 lie side by side. In so doing, the supporting elements 7, 8 and/or the resting elements 16, 17 can be brought to interlock in a positive or non-positive manner without any further measure, thus fixating the spectacles in the non-use position. Furthermore, additional shapes may be provided on the supporting elements 7, 8 and/or on the resting elements 16, 17, said shapes interlocking preferably in a positive manner when the spectacles are placed in their non-use position.

Increased wearing comfort and particularly secure fitting is obtained when the resting elements 16, 17 rest on the temple-sided ends of the arches of the eyebrows, when the spectacles are worn by a spectacles wearer. In this region, the anatomy of the human skull is provided with depressions in which spherical resting elements 16, 17 in particular find a particularly secure fit. On account of the thus resulting additional positive locking, the pressing force applied by the spring element 15 may be kept particularly low, thus increasing wearing comfort.

Further advantages derive from spectacles with at least one lens 1, 2, at least one resting surface 6 for the nose of a spectacles wearer and two laterally arranged, pivotal supporting elements 7, 8, the spectacles being provided with at least one spring element, which presses the supporting elements 7, 8 against the head of the spectacles wearer so that the supporting elements 7, 8 are held on the head of the spectacles wearer in a non-positive manner. More specifically, two lenses 1, 2 may be joined together by way of the spring element.

Further advantages can be obtained when the lenses 1, 2 are joined together by way of two bridges 9, 10, the spring element being arranged between the bridges 9, 10 and each bridge 9, 10 being provided in the area of the spring element with an arm of a lever 13, 14, wherein the lever arms 13, 14 are set at angles when the spectacles are folded and are abutting when the spectacles are unfolded. In this embodiment, the spring element is advantageously realized by means of a spiral spring 15, whose ends are connected to the lever arms 13, 14.

An advantageous effect may also be obtained by having the supporting elements 7, 8 connected to the lens or lenses 1, 2 by way of spring elements.

It provides benefits in all embodiments when the surfaces of the supporting elements 7, 8 facing the head of the spectacles wearer are provided with an elastic top surface. The elastic top surface may in particular take the form of a gel pad. It is generally an advantage to have the surfaces of the supporting elements 7, 8 facing the head of the spectacles wearer provided with a top surface having a high coefficient of friction. This may be realized by a top surface made of a neoprene-like material for example.

What is claimed is:

1. Spectacles with two lenses fitted in bows, comprising:

at least one resting surface arranged between the lenses, wherein the surface is adapted for the nose of a spectacles wearer;

two supporting elements laterally arranged on the lenses, wherein the supporting elements comprise sides facing the head of the spectacles wearer and resting elements arranged on end areas of the sides facing the head of the spectacles wearer; and a hinge having a definitive axis, wherein said hinge is arranged between the lenses, whereby the spectacles can be placed in a non-use position in which the spectacles are folded, and the lenses are arranged substantially one above the other and can be placed in an unfolded position for wearing in which the supporting elements rest against the head of the wearer;

a spring element arranged between the lenses in the area of the hinge, the spring element pressing the supporting elements against the temple region of the spectacles wearer in the area of the resting elements so that the spectacles are held on the head of the spectacles wearer;

wherein each supporting element is rigidly connected to one of the bows such that the supporting elements form a fixed angle with the respective adjacent lens of between approximately 60° and 120°, wherein the length of the supporting elements is measured such that they do not project beyond the temples of the spectacles wearer, wherein the supporting elements are provided with the least possible elastic deformability, so that the elastic force resulting from the spring element is almost completely acting on the temples of the spectacles wearer, and wherein in the non-use position the lenses directly oppose each other.

2. Spectacles according to claim 1, wherein the spring element is made of a synthetic material which is elastically deformable.

3. Spectacles according to claim 1, wherein the elastic resilient movement of the spring element from the position for wearing to the non-use position takes at least 5 seconds, wherein the hinge and the spring element are combined in one component part which is provided with the hinge effect of the hinge as well as with the spring effect of the spring element.

4. Spectacles according to claim 1, wherein the resting elements are formed by elastic, substantially spherical elements which are arranged on the ends of the supporting elements.

5. Spectacles according to claim 1, wherein the axis of rotation of the hinge is inclined to a straight line passing through the two highest points of the lenses at an angle of less than 90°.

6. Spectacles according to claim 1, further comprising a locking means, wherein the spectacles are locked when they are placed in the non-use position.

7. Spectacles according to claim 1, wherein the length of the supporting elements and the position of the resting elements are selected to allow the resting elements to fit on the temple-sided ends of the arches of the eyebrows.

* * * * *